(12) United States Patent
Sugiyama

(10) Patent No.: US 6,203,754 B1
(45) Date of Patent: Mar. 20, 2001

(54) BRAZING FILLER METAL SUPERIOR IN CORROSION RESISTANCE AND HEAT RESISTANCE, AND EGR COOLER BRAZED WITH SAID BRAZING FILLER METAL

(75) Inventor: Motoharu Sugiyama, Numazu (JP)

(73) Assignee: Usui Kokusai Sangyo Kaisha Limited (JP)

( * ) Notice: Subject to any disclaimer, the term of this patent is extended or adjusted under 35 U.S.C. 154(b) by 0 days.

(21) Appl. No.: 09/489,974

(22) Filed: Jan. 24, 2000

(30) Foreign Application Priority Data

Jan. 27, 1999 (JP) .................................. 11-018465

(51) Int. Cl.[7] ............................. C22C 19/05; B32B 15/00
(52) U.S. Cl. ......................... 420/442; 75/255; 428/680; 428/679; 428/685; 228/262.42
(58) Field of Search ............................. 420/442; 75/255; 428/680, 679, 685; 228/262.42

(56) References Cited

U.S. PATENT DOCUMENTS

| | | | |
|---|---|---|---|
| 3,953,285 | * | 4/1976 | Martini et al. ..................... 176/66 |
| 4,283,225 | * | 8/1981 | Sexton et al. ..................... 75/170 |
| 4,302,515 | * | 11/1981 | DeCristofaro et al. ............. 428/680 |
| 4,745,037 | * | 5/1988 | DeCristofaro et al. ............. 428/678 |
| 5,915,472 | * | 6/1999 | Takikawa et al. ................. 165/158 |

* cited by examiner

*Primary Examiner*—Daniel J. Jenkins
*Assistant Examiner*—Nicole Coy
(74) *Attorney, Agent, or Firm*—Anthony J. Casaella; Gerald E. Hespos; Michael J. Porco

(57) ABSTRACT

The present invention provides a brazing filler metal whose brazing temperature is 1060–1120° C. which is close to that of BNi-2 specified in JIS Z3265. The present invention also provides a brazing filler metal which has a melting point of 890–980° C. (which is close to that of BNi-7) and is capable of brazing at a temperature lower than 1000° C. The brazing filler metal of the present invention improves the base metal in corrosion resistance without deterioration. In addition, it has good resistance to oxidation and good resistance to corrosion by sulfuric acid. It has high strength, good heat resistance, and good wetting characteristics. It is used to produce durable EGR coolers by brazing. The first brazing filler metal is composed of Cr (20–30 wt %), P (3–10 wt %), Si (2–7 wt %), and Ni (remainder). It may be incorporated with another brazing filler metal composed of Cr (10–15 wt %), P (7–12 wt %), and Ni (remainder) in an amount of 2–15 wt %. The second brazing filler metal is composed of Cr (18.5–29.7 wt %), P (3.1–10.3 wt %), Si (1.7–6.9 wt %), and Ni (remainder). The present invention also provides an EGR cooler brazed with the brazing filler metal mentioned above.

5 Claims, 6 Drawing Sheets

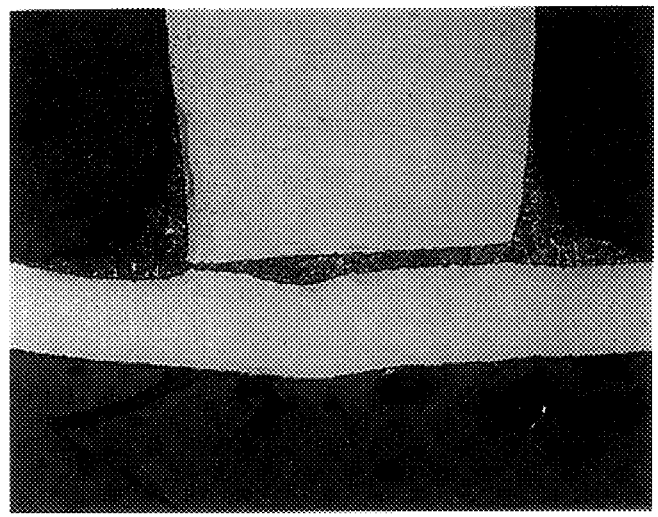
F i g. 2(a)
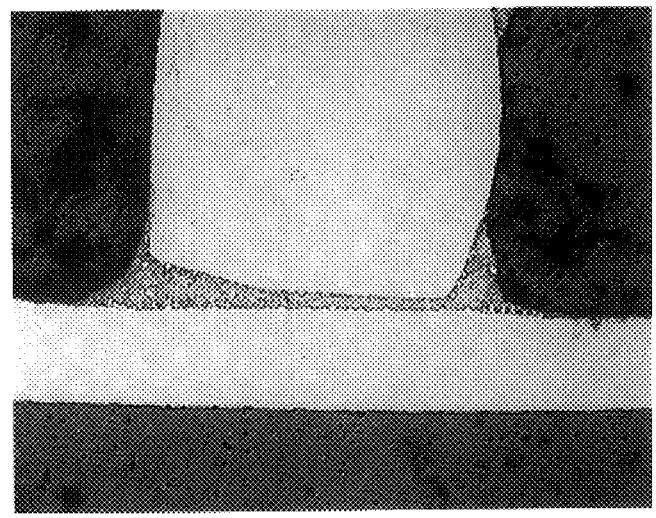
F i g. 2(b)
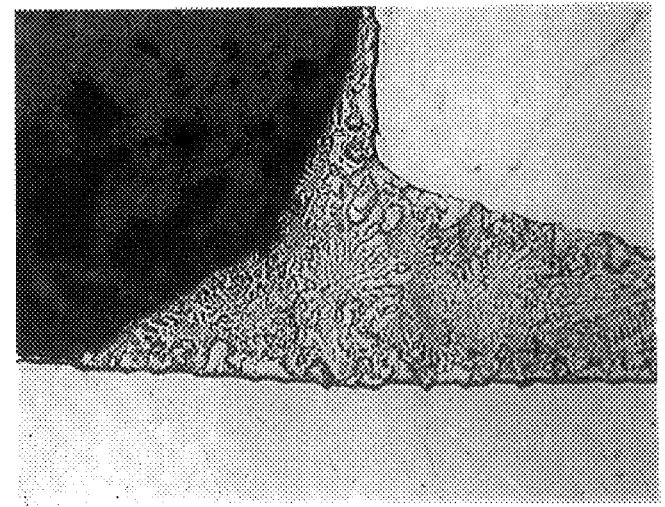
F i g. 2(c)

BRAZING FILLER METAL SUPERIOR IN CORROSION RESISTANCE AND HEAT RESISTANCE, AND EGR COOLER BRAZED WITH SAID BRAZING FILLER METAL

BACKGROUND OF THE INVENTION

1. Field of the Invention

The present invention relates to a brazing filler metal superior in corrosion resistance and heat resistance. More particularly, the present invention relates to a brazing filler metal superior in resistance to corrosion by sulfuric acid, which is used for a component of the EGR system (such as EGR cooler). The present invention relates also to an EGR cooler brazed with said brazing filler metal.

2. Description of the Prior Art

Among components requiring high corrosion resistance and heat resistance is that of the EGR (Exhaust Gas Recirculation) system. This system is designed to take out part of exhaust gas from the exhaust system and return it to the induction system of the engine, thereby adding it to mixture. EGR is effective in suppressing the formation of nitrogen oxides, reducing the pumping loss, decreasing the temperature of combustion gas, thereby reducing radiation heat which escapes to the coolant, and increasing the specific heat due to change in amount and composition of the working gas, thereby improving the cycling efficiency. Therefore, it is regarded as an effective means to improve the thermal efficiency of an engine while purifying exhaust gas.

The EGR system mentioned above consists of such components as EGR pipe and EGR valve. Unfortunately, the EGR valve is subject to thermal deterioration (leading to early breakage) as the EGR gas increases in temperature and volume. Coping with this needs a water-cooled structure. In addition, EGR increases the intake temperature and hence decreases the charging efficiency, which leads to a decrease in fuel efficiency. In order to get around these difficulties, there has been developed a cooled EGR system which is so designed as to cool EGR gas with the engine coolant. The cooled EGR system is equipped with an EGR cooler which is a multi-tubular heat exchanger made of austenitic stainless steel (Japanese Patent Laid-open No. 89491/1997) or a plate-type heat exchanger (Japanese Patent Laid-open No. 89880/1998).

Meanwhile, the component (particularly the EGR cooler) of the cooled EGR system is assembled conventionally by brazing with a brazing filler metal designated as BNi-5 in JIS Z3265. BNi-5 is composed of Cr (18–19 wt %), Si (9.5–10.5 wt %), B (0.03 wt % or less), C (0.10 wt % or less), P (0.02 wt % or less), and Ni (remainder). This brazing filler material, however, suffers the disadvantage of having a high melting point of about 1080 to 1135° C. It needs a brazing temperature as high as 1150–1205° C. Brazing at such a high temperature deteriorates the base metal and also produces an adverse effect on corrosion resistance due to precipitation of chromium carbide. This created demand for a brazing filler metal capable of brazing at a lower temperature than before. This demand has been met by the one designated as BNi-2 in JIS Z3265. BNi-2 is composed of Cr (6.0–8.0 wt %), B (2.75–3.50 wt %), Si (4.0–5.0 wt %), Fe (2.5–3.5 wt %), C (0.06 wt % or less), P (0.02 wt % or less), and Ni (remainder). It has a melting point of about 970–1000° C. and is capable of brazing at 1010–1175° C.

BNi-2 is still unsatisfactory because it is poor in resistance to sulfuric acid. Exhaust gas being circulated in the EGR system condenses upon cooling, and the resulting condensate contains sulfuric acid which causes corrosion to the brazing filler metal itself and its diffused part.

Among brazing filler metals specified in JIS Z3265, BNi-7 is the lowest in melting point. It is composed of Cr (13.0–15.0 wt %), B (0.01 wt % or less), Si (0.10 wt % or less), Fe (0.20 wt % or less), C (0.08 wt % or less), P (9.7–10.5 wt %), and Ni (remainder). It has a melting point of 890° C., which is lower than that of BNi-2; however, it is poor in resistance to corrosion by sulfuric acid.

SUMMARY OF THE INVENTION

The first object of the present invention is to provide a brazing filler metal and a durable EGR cooler brazed with it. Like BNi-2 mentioned above, this brazing filler metal is capable of brazing at 1060–1120° C. It protects the base metal from degradation and improves its corrosion resistance. It has high strength. It exhibits good corrosion resistance and heat resistance (particularly resistance to oxidation and corrosion by sulfuric acid). It also exhibits good wetting characteristics.

The second object of the present invention is to provide a brazing filler metal and a durable EGR cooler brazed with it. This brazing filler metal has a melting point of 890–980° C. and is capable of brazing at 1100° C. or below. (The melting point is close to that of BNi-7, and the brazing temperature is lower than that of BNi-2 mentioned above). It protects the base metal from degradation and improves its corrosion resistance. It has high strength. It exhibits good corrosion resistance and heat resistance (particularly resistance to oxidation and corrosion by sulfuric acid). It also exhibits good wetting characteristics.

The first object mentioned above is achieved by the first embodiment of the present invention. The first embodiment is concerned with a brazing filler metal superior in corrosion resistance and heat resistance which is composed of Cr (20–30 wt %), P (3–10 wt %), Si (2–7 wt %), and Ni (remainder). The brazing filler metal may be incorporated with another brazing filler metal composed of Cr (10–15 wt %), P (7–12 wt %), and Ni (remainder) in an amount of 2–15 wt %. The first embodiment is concerned also with an EGR cooler brazed with said brazing filler metal.

The second object mentioned above is achieved by the second embodiment of the present invention. The second embodiment is concerned with a brazing filler metal superior in corrosion resistance and heat resistance which is composed of Cr (18.5–29.7 wt %), P (3.1–10.3 wt %), Si (1.7–6.9 wt %), and Ni (remainder). The second embodiment is concerned also with an EGR cooler brazed with said brazing filler metal.

BRIEF DESCRIPTION OF THE DRAWINGS

FIGS. 2(a) to 2(c) are microphotographs showing the metal structure of the brazed part obtained in Example 1. FIG. 2(a) is the one (×38) taken before corrosion test. FIG. 2(b) is the one (×38) taken after corrosion test. FIG. 2(c) is an enlarged one (×100) of FIG. 2(b).

FIG. 3(a) is the one (×38) taken before corrosion test. FIG. 3(b) is the one (×38) taken after corrosion test. FIG. 3(c) is an enlarged one (×100) of FIG. 3(b).

FIG. 4(a) is the one (×38) taken before corrosion test. FIG. 4(b) is the one (×38) taken after corrosion test. FIG. 4(c) is an enlarged one (×100) of FIG. 4(b).

FIG. 6(a) is the one (×38) taken before corrosion test. FIG. 6(b) is the one (×38) taken after corrosion test. FIG. 6(c) is an enlarged one (×100) of FIG. 6(b).

DETAILED DESCRIPTION OF THE INVENTION

Figure 1:
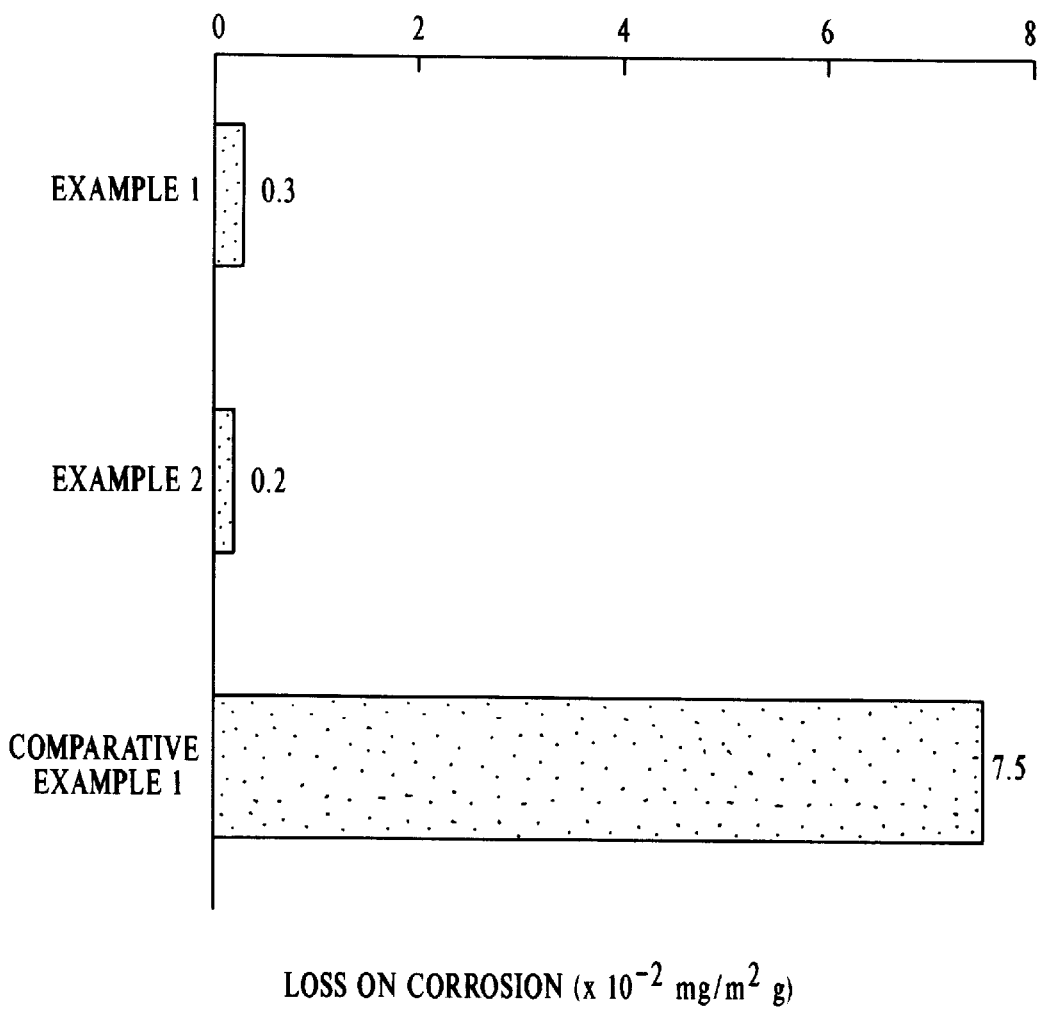
FIG. 1 is a graph showing the result of test for resistance to corrosion by 5% sulfuric acid in Examples 1 and 2 (both pertaining to the first embodiment) and Comparative Example 1.

The first embodiment of the present invention is concerned with a brazing filler metal composed of Cr (20–30 wt %), P (3–10 wt %), Si (2–7 wt %), and Ni (remainder). The function of each component is explained below.

Cr contributes to resistance to corrosion by sulfuric acid. With a Cr content more than 30 wt %, the brazing filler metal has such a high melting point that it causes the base metal to deteriorate in quality or decrease in corrosion resistance and it prevents continuous brazing operation in a furnace and hence aggravates productivity. With a Cr content less than 20 wt %, the brazing filler metal is poor in resistance to corrosion by sulfuric acid and hence it cannot be applied to EGR coolers which need durability.

P decreases the melting point of the brazing filler metal. With a P content more than 10 wt % or less than 3 wt %, the brazing filler metal has such a high melting point that it causes the base metal to deteriorate in quality or decrease in corrosion resistance.

Si increases the strength of the brazing filler metal. With an Si content more than 7 wt %, the brazing filler metal is brittle and subject to oxidation. with an Si content less than 2 wt %, the brazing filler metal is poor in strength and subject to cracking (after brazing).

The brazing filler metal according to the first embodiment of the present invention is characterized by its low melting point of 970–1080° C. (and hence low brazing temperature of 1060–1120° C.) which is realized without loss in brazing strength.

The present invention also covers another brazing filler metal which is obtained by incorporating the above-mentioned brazing filler metal (referred to as the first brazing filler metal) with 2–15 wt % of the second brazing filler metal which is composed of Cr (10–15 wt %), P (7–12 wt %), and Ni (remainder).

The second brazing filler metal suppresses oxidation of the first brazing metal and improves wetting characteristics of the first brazing filler metal. It lowers the melting point of the combined brazing filler metal by about 100° C. to 890–980 ° C. (permitting brazing operation at 950–1050° C.). The amount of the second brazing filler metal should be 2–15 wt % to prevent an occurrence of erosion and corrosion to the base metal. With an amount less than 2 wt %, the second brazing filler metal does not produce the above-mentioned effect (or suppression of oxidation and wetting characteristics). With an amount more than 15 wt %, the second brazing filler metal causes erosion and corrosion to the base metal.

Cr in the second brazing filler metal improves the first brazing filler metal in resistance to corrosion by sulfuric acid. With an amount more than 15 wt %, Cr increases the melting point, causing the base metal to deteriorate in quality and to decrease in corrosion resistance. With an amount less than 10 wt %, Cr causes the combined brazing filler metal to decrease in resistance to corrosion by sulfuric acid.

P in the second brazing filler metal lowers the melting point and improves the wetting characteristics. With an amount more than 12 wt % or less than 7 wt %, P does not produce the above-mentioned effect.

The first and second brazing filler metals may be used in any of the following manners.

(a) Mix them together in the form of powder.
(b) Mix them together in the form of paste.
(c) Place them one over the other in the form of paste or foil.

In the third manner, the lower layer should be formed from the first brazing filler metal and the upper layer should be formed from the second brazing filler metal. This arrangement permits the upper layer (of the second brazing filler metal having a lower melting point) to melt first, covering the lower layer (of the first brazing filler metal).

The brazing filler metal pertaining to the first embodiment of the present invention is applied to multi-tubular EGR coolers or plate-type EGR coolers.

Multi-tubular EGR coolers have heat-exchanger tubes made of austenitic stainless steel, such as SUS304, SUS304L, SUS316, SUSD316L, and SUS321. These tubes are 6.35 mm or 5.00 mm in outside diameter and 120–600 mm in length. (The lengths are not specifically restricted.) The shell and tube sheet may be made of the same material as mentioned above or may be casting of SCS corresponding to the above-mentioned material.

In the case of plate-type EGR coolers, their flat plate or corrugated plate may also be made of the same material as mentioned above.

The brazing filler metal according to the second embodiment of the present invention is composed of Cr (18.5–29.7 wt %), P (3.1–10.3 wt %), Si (1.7–6.9 wt %), and Ni (remainder). The function of each component is explained below.

Cr contributes to resistance to corrosion by sulfuric acid. With a Cr content more than 29.7 wt %, the brazing filler metal does not permit brazing operation at temperatures lower than 1100° C. Brazing at high temperatures causes the base metal to deteriorate in quality and corrosion resistance. It also prevents continuous brazing operation in a furnace and hence aggravates productivity. With a Cr content less than 18.9 wt %, the brazing filler metal is poor in resistance to corrosion by sulfuric acid and hence it cannot be applied to EGR coolers which need durability.

P decreases the melting point of the brazing filler metal. With a P content more than 10.3 wt % or less than 3.1 wt %, the brazing filler metal does not permit brazing operation at 1100° C. or below and brazing at high temperatures causes the base metal to deteriorate in quality and corrosion resistance.

Si increases the strength of the brazing filler metal. With an Si content more than 6.9 wt %, the brazing filler metal is brittle and subject to oxidation. With an Si content less than 1.7 wt %, the brazing filler metal is poor in strength and subject to cracking (after brazing).

The brazing filler metal pertaining to the second embodiment of the present invention has a melting point as low as 890–980° C. and hence permits brazing to be carried out at 950–1050° C. with improved wetting characteristics, without impairing brazing strength.

The brazing filler metal of the present invention can be used in the form of powder, paste, foil, or sheet when it is applied to the brazing part. In addition, it can be used at a low brazing temperature and hence it permits continuous brazing operation in a furnace with a reducing atmosphere.

The aforesaid brazing filler metal pertaining to the second embodiment of the present invention is used for the brazing of multi-tubular EGR coolers and plate-type EGR coolers.

As to the material and dimensions of the components of the multi-tubular EGR coolers or as to the flat plate and corrugated plate of the plate-type EGR coolers, the same explanation as mentioned above in the first embodiment is applicable.

EXAMPLES

The invention will be described with reference to the following Examples and Comparative Examples.

Example 1

A brazing filler metal specified below was used to braze a multi-tubular EGR cooler (for a diesel car) which consists of precision-cast end caps (made of SCS13), tube sheet, shell, and heat-exchanger tubes (made of SUS304). The shell holds 30 heat-exchanger tubes, each measuring 6.35 mm in outside diameter and 250 mm long.

Cr: 25 wt %, P: 8 wt %, Si: 6 wt %, Ni: remainder.

The brazing filler metal (in the form of powder) was mixed with a binder to be made into a paste. Brazing was carried out continuously in a furnace of hydrogen atmosphere at 1100° C. The EGR cooler obtained by brazing in this manner was tested for resistance to corrosion by 5% sulfuric acid as follows.

Sulfuric acid: 5 wt % (dilute d with distilled water)

Solution temperature: 80° C.

Method: immersion in solution (with stirring)

Judgment: by measurement of loss on corrosion after immersion for 24 hours

The results of the test are shown in FIGS. 1 and 2.

It is noted from FIGS. 1 and 2 that very little corrosion occurred in the brazing filler metal and the base metal into which the brazing filler metal had diffused. It is concluded that the brazing filler metal in this example is superior in resistance to corrosion by sulfuric acid.

Example 2

Brazing with two kinds of brazing filler metals (both in paste form) was performed as follows on the same EGR cooler as used in Example 1. A first brazing filler metal is the same one as in Example 1. A second brazing filler metal is composed of Cr (12 wt %), P (8 wt %), and Ni (remainder). They were applied sequentially in two layers. The ratio of the first one to the second one is 90:10 in wt %. Brazing was carried out continuously in a furnace of hydrogen atmosphere at 1100° C. The EGR cooler obtained by brazing in this manner was tested for resistance to corrosion by 5% sulfuric acid in the same way as in Example 1. The results are shown in FIGS. 1 and 3.

Figure 3A:
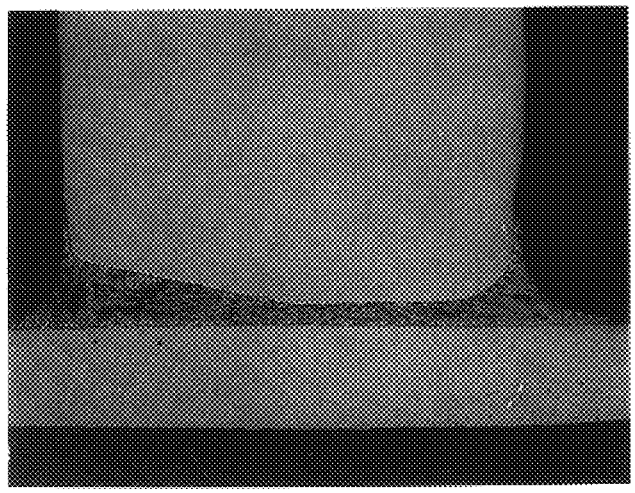
FIGS. 3(a) to 3(c) are microphotographs showing the metal structure of the brazed part obtained in Example 2.
Figure 3B:
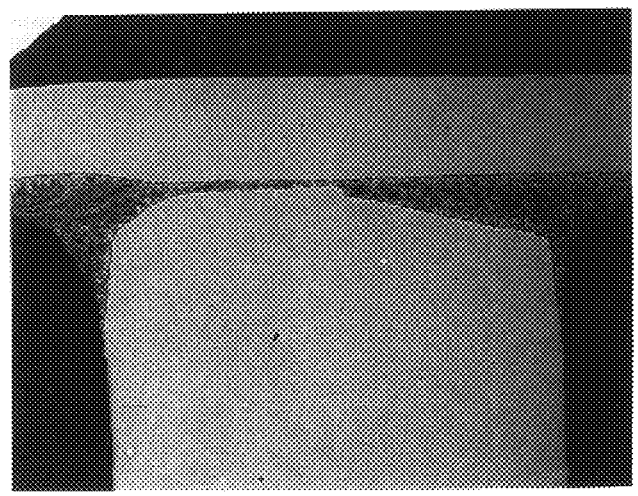
Figure 3C:
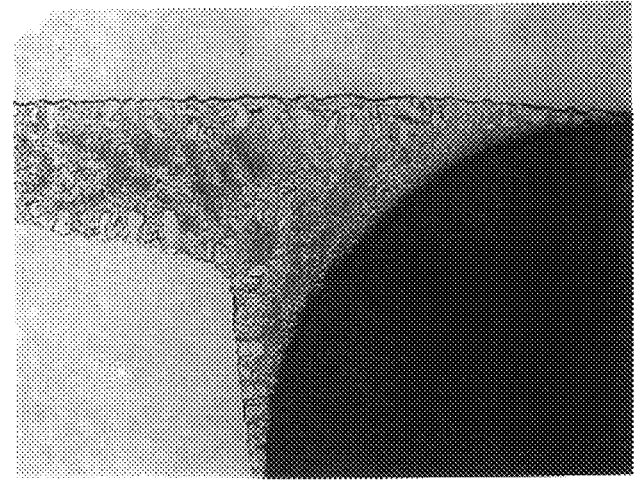

It is noted from FIGS. 1 and 3 that very little corrosion occurred in the brazing filler metal and the base metal into which the brazing filler metal had diffused. It is concluded that the brazing filler metal in this example is superior in resistance to corrosion by sulfuric acid.

COMPARATIVE EXAMPLE 1

Brazing with a brazing filler metal of the following composition was performed as follows on the same EGR cooler as used in Example 1.

Cr (7 wt %), B (3 wt %), Si (4 wt %), Fe (3 wt %), Ni (remainder) (This brazing filler metal is that designated as BNi-2 in JIS Z3265.) After mixing with a binder, the brazing filler metal in paste form was used for continuous brazing at 1070° C. in a furnace of hydrogen atmosphere.

The EGR cooler obtained by brazing in this manner was tested for resistance to corrosion by 5% sulfuric acid in the same way as in Example 1. The results are shown in FIGS. 1 and 4.

Figure 4A:
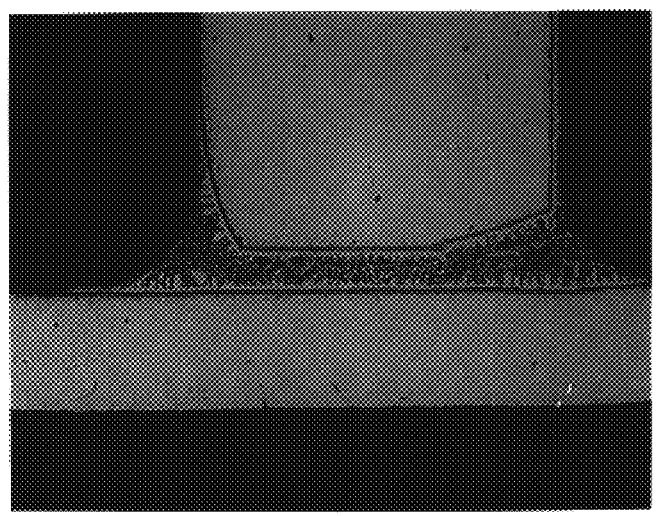
FIGS. 4(a) to 4(c) are microphotographs showing the metal structure of the brazed part obtained in Comparative Example 1.
Figure 4B:
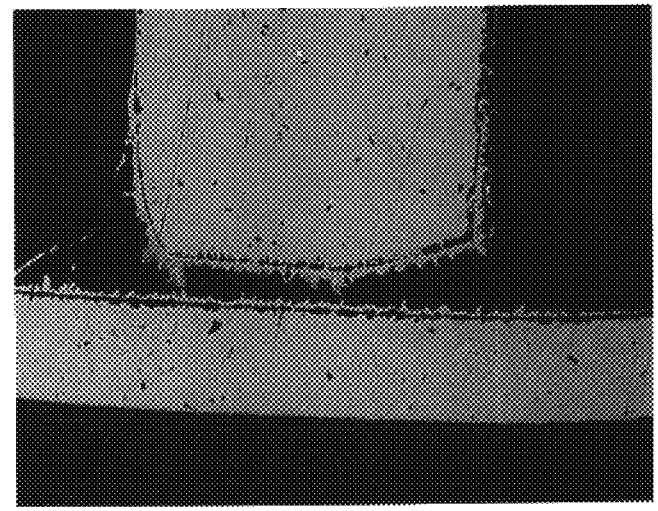
Figure 4C:
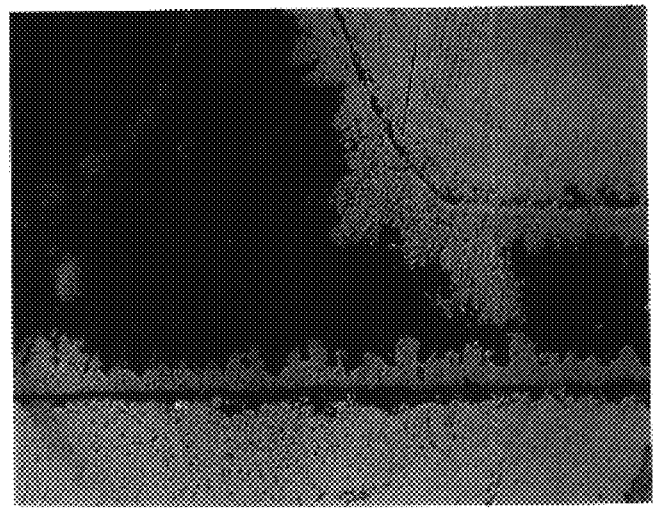

It is noted from FIGS. 1 and 4 that corrosion occurred in the brazing filler metal and the base metal into which the brazing filler metal had diffused. This corrosion is due to boron which has diffused into the base metal.

Example 3

Brazing with a brazing filler metal of the following composition was performed as follows on the same EGR cooler as used in Example 1.

Cr (23.8 wt %), P (7.3 wt %), Si (4.5 wt %), Ni (remainder) (This brazing filler metal has a melting point of 890–950° C.) After mixing with a binder, the brazing filler metal in paste form was used for continuous brazing at 1040° C. in a furnace of hydrogen atmosphere.

Figure 5:
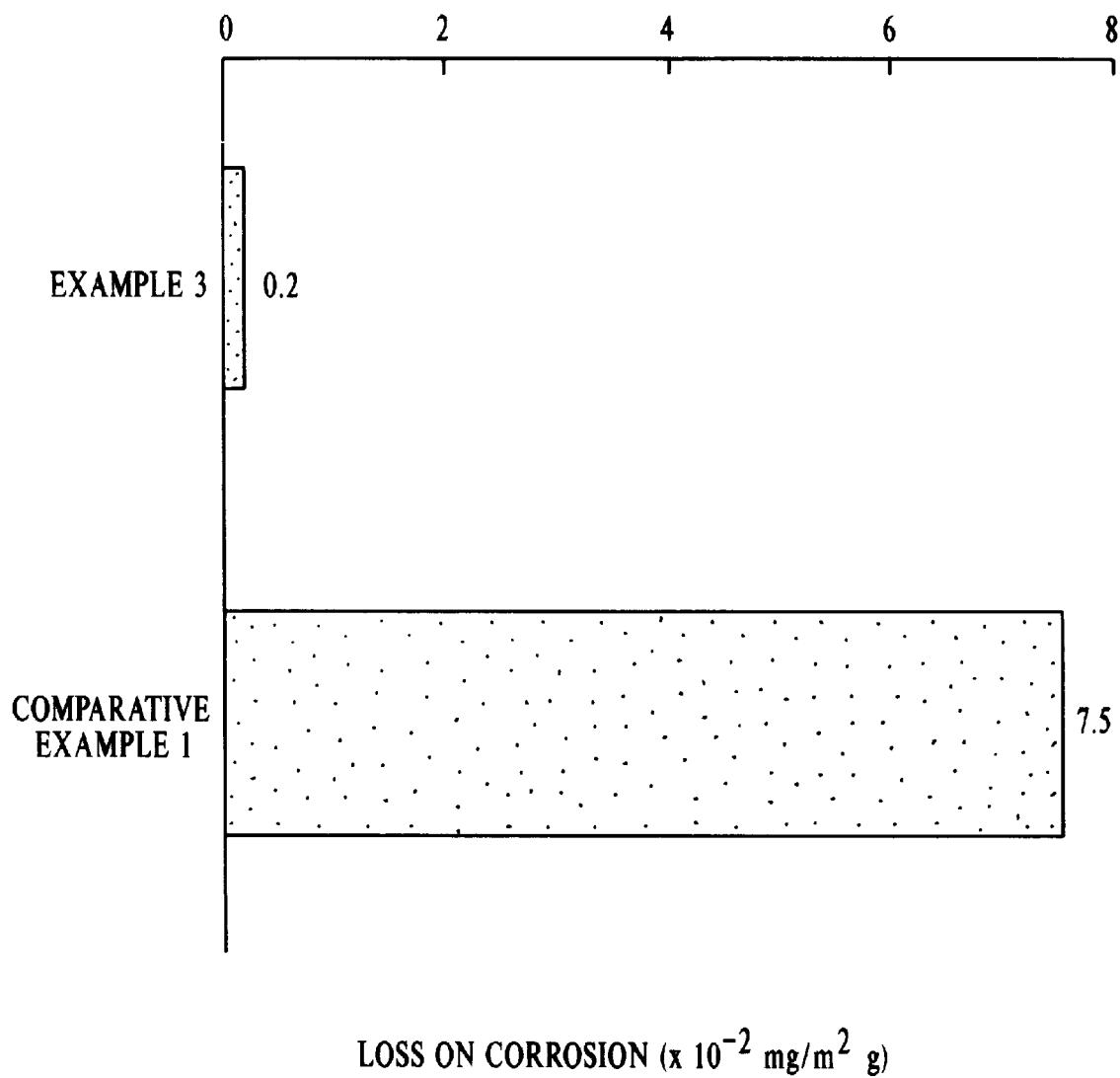
FIG. 5 is a graph showing the result of test for resistance to corrosion by 5% sulfuric acid in Example 3 (pertaining to the second embodiment) and Comparative Example 1.
Figure 6A:
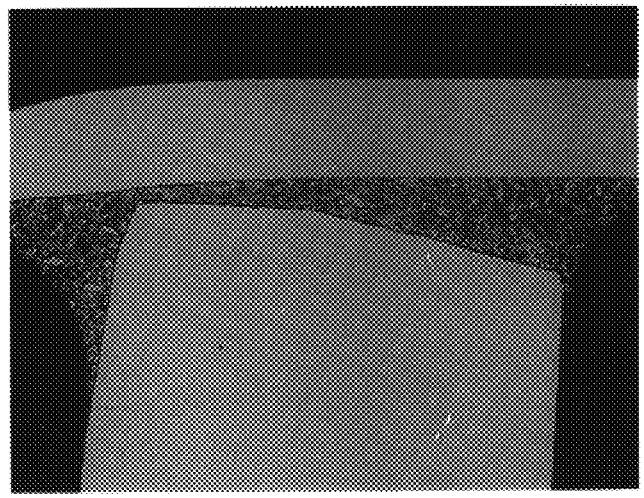
FIGS. 6(a) to 6(c) are microphotographs showing the metal structure of the brazed part obtained in Example 3.
Figure 6B:
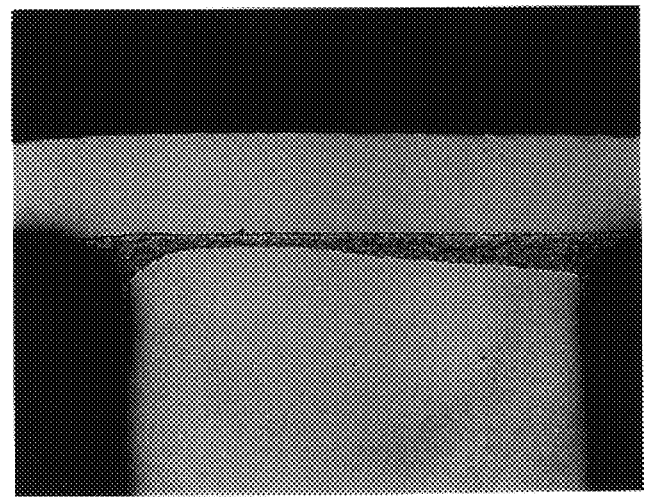
Figure 6C:
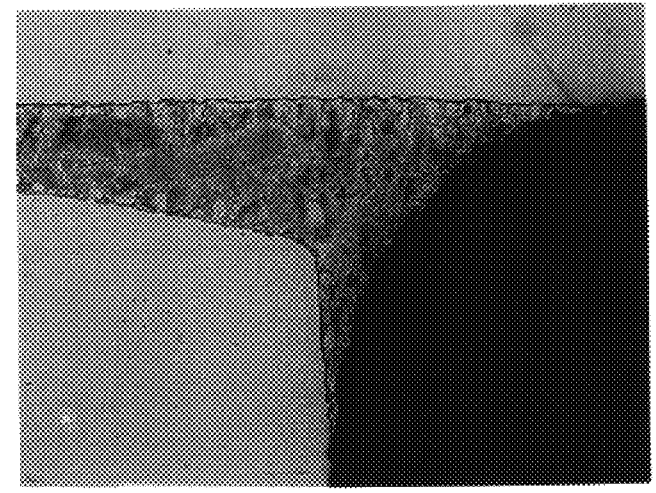

The EGR cooler obtained by brazing in this manner was tested for resistance to corrosion by 5% sulfuric acid in the same way as in Example 1. The results are shown in FIGS. 5 and 6. (Incidentally, FIG. 5 is compared with the result in Comparative Example 1 to facilitate understanding.)

It is noted from FIGS. 5 and 6 that very little corrosion occurred in the brazing filler metal and the base metal into which the brazing filler metal had diffused. It is concluded that the brazing filler metal in this example is superior in resistance to corrosion by sulfuric acid.

As mentioned above, the brazing filler metal of the present invention permits brazing at 1060–1120° C. which is close to the brazing temperature of BNi-2 specified in JIS Z3265. Also, the brazing filler metal of the present invention has a melting point of 890–980° C. which is close to that of BNi-7 and permits brazing at a temperature lower than 1000° C. Therefore, the brazing filler metal of the present invention improves the base metal in corrosion resistance without deterioration. In addition, it has good resistance to oxidation and good resistance to corrosion by sulfuric acid. It has high strength, good heat resistance, and good wetting characteristics. It is used to produce durable EGR coolers by brazing.

What is claimed is:

1. A brazing filler metal superior in corrosion resistance and heat resistance consisting essentially of Cr 25–30 wt %, P 3–10 wt %, Si 2–7 wt %, and remainder Ni.

2. A brazing filler metal superior in corrosion resistance and heat resistance which is formed by incorporating the brazing filler metal of claim 1 with another brazing filler metal composed of Cr 10–15 wt %, P 7–12 wt %, and remainder Ni in an amount of 2–15 wt %.

3. An EGR cooler brazed with the brazing filler metal defined in claim 1.

4. A brazing filler metal superior in corrosion resistance and heat resistance consisting essentially of Cr 23.8–29.7 wt %, P 3.1–10.3 wt %, Si 1.7–6.9 wt %, and remainde Ni.

5. An EGR cooler brazed with the brazing filler metal defined in claim 4.

* * * * *

(12) INTER PARTES REEXAMINATION CERTIFICATE (0113th)
United States Patent
Sugiyama

(10) Number: US 6,203,754 C1
(45) Certificate Issued: Nov. 24, 2009

(54) BRAZING FILLER METAL SUPERIOR IN CORROSION RESISTANCE AND HEAT RESISTANCE, AND EGR COOLER BRAZED WITH SAID BRAZING FILLER METAL

(75) Inventor: Motoharu Sugiyama, Numazu (JP)

(73) Assignee: Usui Kokusai Sangyo Kaisha Limited, Shizuoka Prefecture (JP)

Reexamination Request:
No. 95/000,363, Apr. 28, 2008

Reexamination Certificate for:
Patent No.: 6,203,754
Issued: Mar. 20, 2001
Appl. No.: 09/489,974
Filed: Jan. 24, 2000

(30) Foreign Application Priority Data
Jan. 27, 1999 (JP) .......................... 11-018465

(51) Int. Cl.
*B23K 35/30* (2006.01)

(52) U.S. Cl. .................... 420/442; 228/262.42; 428/679; 428/680; 428/685; 75/255

(58) Field of Classification Search .................... None
See application file for complete search history.

(56) References Cited

U.S. PATENT DOCUMENTS 5,718,211 A * 2/1998 Halsall et al. .......... 123/568.11

6,203,754 B1 3/2001 Sugiyama

FOREIGN PATENT DOCUMENTS

JP 9225679 9/1977

* cited by examiner

*Primary Examiner*—Jerry D. Johnson

(57) ABSTRACT

The present invention provides a brazing filler metal whose brazing temperature is 1060–1120° C. which is close to that of BNi-2 specified in JIS Z3265. The present invention also provides a brazing filler metal which has a melting point of 890–980° C. (which is close to that of BNi-7) and is capable of brazing at a temperature lower than 1000° C. The brazing filler metal of the present invention improves the base metal in corrosion resistance without deterioration. In addition, it has good resistance to oxidation and good resistance to corrosion by sulfuric acid. It has high strength, good heat resistance, and good wetting characteristics. It is used to produce durable EGR coolers by brazing. The first brazing filler metal is composed of Cr (20–30 wt %), P (3–10 wt %), Si (2–7 wt %), and Ni (remainder). It may be incorporated with another brazing filler metal composed of Cr (10–15 wt %), P (7–12 wt %), and Ni (remainder) in an amount of 2–15 wt %. The second brazing filler metal is composed of Cr (18.5–29.7 wt %), P (3.1–10.3 wt %), Si (1.7–6.9 wt %), and Ni (remainder). The present invention also provides an EGR cooler brazed with the brazing filler metal mentioned above.

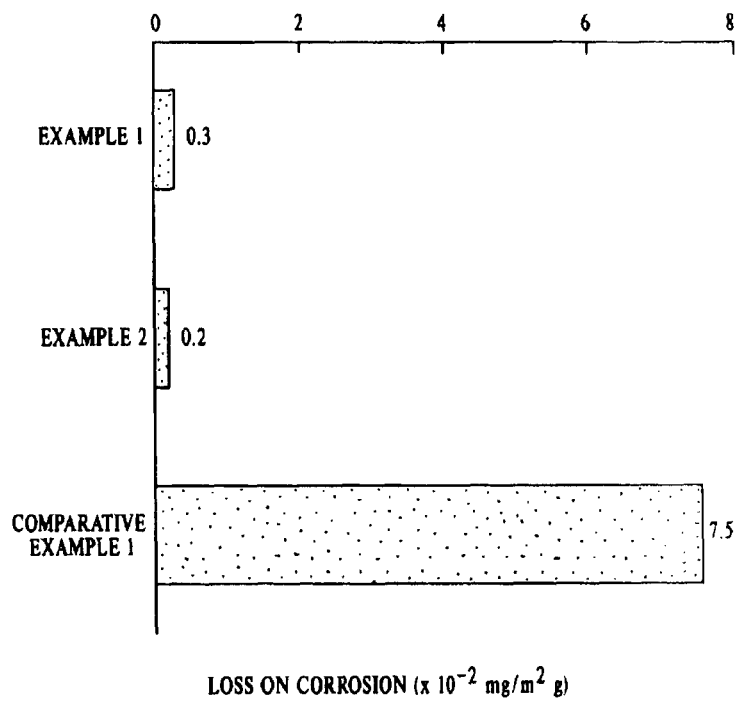

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1–5 are cancelled.

* * * * *